US006973478B1

(12) United States Patent
Ketonen et al.

(10) Patent No.: US 6,973,478 B1
(45) Date of Patent: Dec. 6, 2005

(54) AUTONOMOUS LOCAL ASSISTANT FOR MANAGING BUSINESS PROCESSES

(75) Inventors: Jussi Ketonen, Palo Alto, CA (US); Carolyn Talcott, Stanford, CA (US); Paul Wieneke, Los Altos, CA (US)

(73) Assignee: Top Moxie, Inc., Palo Alto, CA (US)

( * ) Notice: Subject to any disclaimer, the term of this patent is extended or adjusted under 35 U.S.C. 154(b) by 694 days.

(21) Appl. No.: 09/696,558

(22) Filed: Oct. 25, 2000

Related U.S. Application Data

(60) Provisional application No. 60/161,701, filed on Oct. 26, 1999.

(51) Int. Cl.[7] ............................................ G06F 15/16
(52) U.S. Cl. .................... 709/203; 709/202; 709/217; 709/229
(58) Field of Search .............................. 709/225, 226, 709/227, 202–205, 217–219, 223–229, 246; 713/1–2, 713/100

(56) References Cited

U.S. PATENT DOCUMENTS

| | | | | |
|---|---|---|---|---|
| 5,757,925 | A * | 5/1998 | Faybishenko ............... | 709/203 |
| 6,240,450 | B1 * | 5/2001 | Sharples et al. ............ | 709/224 |
| 6,240,459 | B1 * | 5/2001 | Roberts et al. ............. | 709/232 |
| 6,275,854 | B1 * | 8/2001 | Himmel et al. ............. | 709/224 |
| 6,295,551 | B1 * | 9/2001 | Roberts et al. ............. | 709/205 |
| 6,327,609 | B1 * | 12/2001 | Ludewig et al. ............ | 709/203 |
| 6,421,733 | B1 * | 7/2002 | Tso et al. ................... | 709/217 |
| 6,434,532 | B2 * | 8/2002 | Goldband et al. .............. | 705/7 |
| 6,453,334 | B1 * | 9/2002 | Vinson et al. ............... | 709/203 |
| 6,470,327 | B1 * | 10/2002 | Carroll et al. .............. | 705/401 |
| 6,510,466 | B1 * | 1/2003 | Cox et al. ................... | 709/229 |
| 6,516,338 | B1 * | 2/2003 | Landsman et al. .......... | 709/203 |
| 6,587,876 | B1 * | 7/2003 | Mahon et al. ............... | 709/223 |
| 6,591,289 | B1 * | 7/2003 | Britton ....................... | 709/203 |
| 6,763,458 | B1 * | 7/2004 | Watanabe et al. ........... | 713/100 |

* cited by examiner

Primary Examiner—Bharat Barot
(74) Attorney, Agent, or Firm—Dergosits & Noah LLP

(57) ABSTRACT

A methodology and automated system are provided whereby a merchant presents timely and relevant information to customers. The system includes a client-side local assistant system and a server-side component. The client-side local assistant system, which is download installed on a customer's computer, implements an automated client-side system that is fully data driven. The data is partly downloaded data, called rulesets, and partly data that is collected and stored locally, called interaction data. The client-side system includes functionality for specifying and interpreting rulesets for observing, analyzing and storing information about, and relating to, computer-mediated customer interactions, such as viewing web pages or playing music. The client-side system also includes functionality for defining periodic tasks, such as gathering, analyzing and displaying information on topics of interest, and for direct interaction between the client-side system and the customer. The server-side component stores and provides access, upon request, to a downloadable version of a client side core local assistant system The server-side component also stores and provides access, upon request, to downloadable rulesets maintained by an agent. It also provides functionality for maintaining download statistics and for controlling the number of downloads of given ruleset. The server-side component also provides functionality for collecting data generated by ruleset application for storage in a server-side interaction database. The schema of this database are constrained to maintain customer privacy. The server-side component also provides functionality for reporting information to assisted merchants; the reporting functionality includes at least the ability to report information by merchant, by ruleset, and over a specified period of time.

21 Claims, 17 Drawing Sheets

AUTONOMOUS LOCAL ASSISTANT FOR MANAGING BUSINESS PROCESSES

RELATED APPLICATION

This application claims the benefit of U.S. Provisional Application No. 60/161,701, filed Oct. 26, 1999 by Jussi Ketonen, Carolyn Talcott and Paul Wieneke, and titled "Local Assistant Component that Modifies Interactions with a Global Computer Network."

FIELD OF THE INVENTION

The present invention relates to electronic commerce and, in particular, to information processing systems and methods for marketing, advertisement and timely dissemination of information via the Internet and other interactive media.

BACKGROUND OF THE INVENTION

The most lasting customer relationships are built when a merchant provides a personalized offer at precisely the moment a customer is looking for a product, and when the merchant stays out of the way the rest of the time.

Banner ads don't pay; neither do marketing databases with bogus data. That is the quandary facing online merchants today. Mass marketing techniques are severely ineffective in an interactive medium. Expensive database marketing in which massive amounts of data are collected, cross-referenced and regressed, but is obsolete by the time it is entered into a database, is also highly ineffective. What a merchant needs is very simple: the one customer who is interested in the merchant's products, at the very moment he or she is interested. In other words, merchants need extremely qualified buyers, delivered at exactly the right moment. However, customer privacy must be respected and protected.

Furthermore, marketing techniques that are based on lightweight, extremely flexible mechanisms are needed to meet rapidly changing market PATENT situations. Modifying a merchant's information technology system or Web site(s) is typically much too slow and costly to be effective.

The present invention addresses these and other problems.

SUMMARY OF THE INVENTION

The present invention provides a system and method that enables an internet entity, referred to herein as the "Agent", to provide highly efficient and flexible relevance-based information dissemination services to assist merchants and others, referred to herein as "Assisted Merchants", to bring timely and relevant offers of products and other information to online users, referred to herein as "Customers."

In accordance with one aspect of the invention, the system provides client side software that is extensible and customizable by rules that are downloadable. Each service/application of the system is implemented by a ruleset consisting of rules and supporting meta-data.

In accordance with another aspect of the invention, the system has two main components: (1) a client-side program with a small core that comprises a task scheduler and rule interpreter that is driven by local databases containing downloadable rulesets and interaction data that is collected and stored locally and (2) a server-side program that acts as a download server for the client-side software and manages Assisted Merchant data, rulesets for distribution and collection of statistics generated by rule execution. The server-side program and data reside on a computer system operated by the Agent providing the Local Assistant service. The client-side core and data reside and operate on Customer computers. Internet interactions between the client- and server- side software are secured so that the delivered/installed code and ruleset updates are those intended by the Agent. An Assisted Merchant need not have a Web site or otherwise be connected to the Internet, although that is the typical case.

An important advantage of the rule-based architecture with a small client-side core is that it enables the building of highly fault-tolerant distributed applications in a low-risk and incremental fashion.

In one implementation of the present invention, the server-side software and data resides and operates on the Web site of E-traffic Inc. In this implementation, rulesets are provided to be used for analysis and actions to be taken on HTML pages viewed by the Customer (Web Assistants and Loyalty Program Assistants); analysis and actions to be taken on data extracted from other sources on a Customer's machine, such as CD player's (Listener Assistants) and MP3 players (Viewer Assistants); periodic retrieval of data from the Web (News Assistants); automatic gathering of data from the Web (supporting other assistants); user interface i.e., display of offers and other data and data input by the Customer for client-side system customization; updating other rulesets; and reporting anonymous data/statistics regarding client-side activity.

One method of doing business supported by the present invention is private auctions via downloaded rules that can be used to bid against existing price information on the Customer's machine and prices gleaned from current data streams, such as HTML pages, viewed by or available to the client.

Another method of doing business supported by the present invention comprises loyalty program reminders via downloaded rules that can be used to gather up-to-date information about participating merchants and to provide the Customer with relevant reminders or offers to purchase from participating merchants. This method would be used in conjunction with loyalty programs such as Ebates, SchoolCash, MyPoints and many others.

BRIEF DESCRIPTION OF THE DRAWINGS

These and other features and advantages of the present invention will now be described with reference to the drawings of certain preferred embodiments, which are intended to illustrate and not to limit the invention, and in which:

FIGS. 3a–b also serve, respectively, as an architectural drawing and flow diagram illustrating a Loyalty Program Assistant application producing offers based on analysis of targeted Web pages being viewed by the Customer and on further information gathered from the Web.

Figure 1:
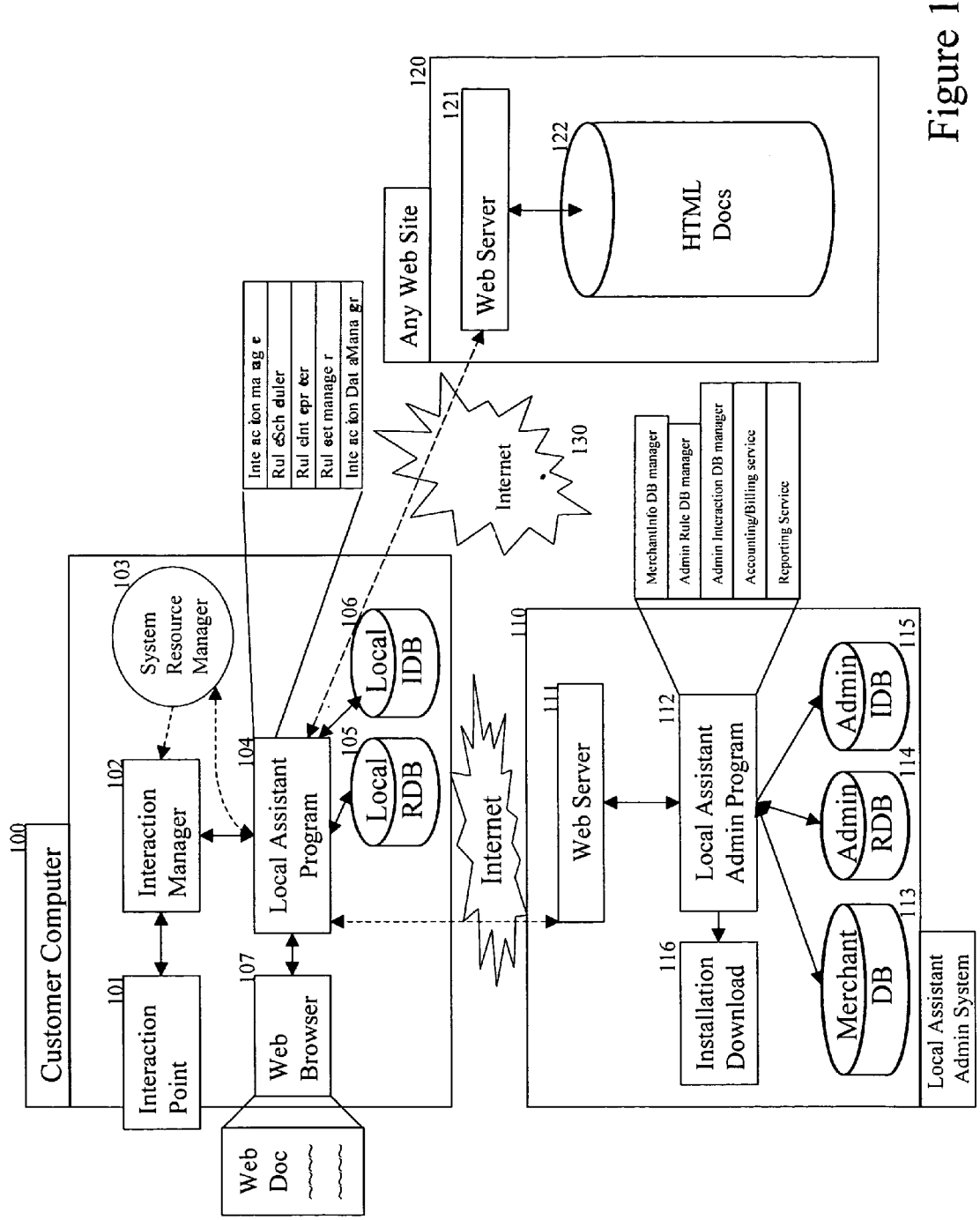
FIG. 1 is a high-level architectural drawing illustrating the primary components of a system that operates in accordance with the present invention.

Note that the applications illustrated in FIGS. 2–7 are implemented as rulesets containing rules for analysis, information gathering and action together with supporting metadata describing the data to be collected and providing HTML templates for Customer interaction. These are provided to exemplify the range of possible applications supported by the core system.

In the drawings, the first digit of each reference number indicates the architectural drawing in which the referenced item first appears. The architectural drawings are derived from three basic architectural components: a Customer computer, the Agent Web server, and generic Web sites. An occurrence of a component in one of the architectural diagrams may have parts omitted that are not relevant to the illustration, or may have parts specialized to the scenario being illustrated.

DETAILED DESCRIPTION OF THE PREFERRED EMBODIMENT

1. Glossary of Terms and Acronyms.

The following terms and acronyms are used throughout the following detailed description of the invention:

Client-server. A model of interaction in a distributed system in which a program at one site sends a request to a program at another site and waits for a response. The requesting program is called the "client" and the program which responds to the request is called the "server". In the context of the World Wide Web (discussed below), the client is a "Web browser" (or simply "browser") that runs on a computer of a user; the program that responds to browser requests by serving Web pages is commonly referred to as a "Web server".

Hyperlink. A navigational link from one document to another. Typically, a hyperlink is displayed as a highlighted word or phrase that can be selected by clicking on it using a mouse to jump to the associated document or document portion.

Hypertext System. A computer-based informational system in which documents (and possibly other types of data entities) are linked together via hyperlinks to form a user navigable "web".

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to standard protocols and advances in communication technology.)

World Wide Web ("Web"). Used herein to refer generally to both (i) a distributed collection of interlinked, user-navigable hypertext documents (commonly referred to as Web documents or Web pages) that are accessible via the Internet, and (ii) the client and server software components which provide user access to such documents using standard Internet protocols. Currently, the primary standard protocol for allowing applications to locate and acquire Web documents is HTTP, and the Web pages are encoded using HTML. If security is of concern, documents can be accessed using the HTTPS protocol. However, the terms "Web" and "World Wide Web" are intended to encompass future markup languages and transport protocols which may be used in place of (or in addition to) HTML and HTTP or HTTPS.

Web Site. A computer system that serves informational content over a network using the standard protocols of the World Wide Web. Typically a Web site corresponds to a particular Internet domain name, such as "e-traffic.com," and includes the content associated with a particular organization. As used herein, the term is generally intended to encompass both (i) the hardware/software server components that serve the informational content over the network and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a Web browser, the codes are interpreted by the browser and used to parse and display the document. Additionally, in specifying how the Web browser is to display the document, HTML tags can be used to create links to other Web documents (commonly referred to as hyperlinks).

HTTP (HyperText Transfer Protocol). The standard World Wide Web client-server protocol used for the exchange of information (such as HTML documents, and client requests for such documents) between a browser and a Web server. HTTP includes a number of different types of messages that can be sent from client to server to request different types of server actions. For example, a "GET" message, which has the form GET <URL>, causes the server to return the document or file located at the specified URL. As another example a "POST" message, which has the form POST <URL>, causes the server to parse the specified URL to extract a function to call and data to supply.

HTTPS (HyperText Transfer Protocol Secured). Extends the HTTP protocol with authentication and encryption to protect the information transmitted during HTTP protocol steps and to provide secure and authenticated interaction with the requested server.

ISBN (International Standard Book Number). A numerical identifier associated with books, pamphlets, educational texts, microfilms, CD-ROM and Braille publications throughout the world. The ISBN is a ten-digit number assigned to each published title that provides an unduplicated, internationally recognized "identity".

URL (Uniform Resource Locator). A unique address which fully specifies the location of a file or other resource on the Internet. The general format of a URL is protocol:// machine address::port/path/filename. The port specification is optional, and if none is entered by the user, then the browser defaults to the standard port for whatever service is specified as the protocol. For example, if HTTP is specified as the protocol, then the browser will use the HTTP default port of 80.

XML (extensible Markup Language). A universal format for putting structured documents and data in a text file. Like HTML, XML uses tags <abc> . . . </abc> to delimit structured components and attributes within tags PATENT such as <mytag name="hello"> to express additional semantic content. Unlike HTTP, XML does not specify the meaning of any tags or attributes. This must be specified for each application that uses XML as a representation format. More information can be found at http://www.w3c.org.

Agent. The provider of a Local Assistant service (for example, E-traffic Inc.)

Assisted Merchant. A merchant (or individual or other entity) that has an assistance agreement with a Local Assistant Agent. An Assisted Merchant will have an entry in the Agent's merchant database and probably some active rulesets in the admin ruleset database.

Customer. A computer user who is a potential customer for an Assisted Merchant (i.e. to whom the Assisted Merchant may want to make offers).

Data Element. A simple piece of data such as a number or string or a structured collection of data such as a list or table, used to represent information.

Meta-data. Specifies properties of a data element, for example the type, how it is to be stored, how it is to be updated, etc.

Information Context. A collection of named data elements. Elements can be accessed by name, named data elements can be added to the collection and removed from the collection, and the association of data to names can be modified.

Alist. A particular means of representing an information context as a list of name-value pairs.

Rule. A syntactic description of conditions for selection and actions to be taken relative to a supplied information context.

Ruleset. An identifiable collection of rules, data and meta-data that work together to implement some Local Assistant functionality.

Rule Interpreter. A computer program that interprets rules in a given information context, determining when a rule is applicable, and carrying out the actions specified by an applicable rule in the given context.

Targeted Site. A Web site containing HTML documents of potential interest for analysis, i.e., for which there are rules to execute when these pages are viewed.

Targeted HTML Document. An HTML document on a targeted site for which there are one or more rulesets containing rules for analyzing the document. Such documents may be recognized by the URL by which they are accessed, but other means are possible.

2. Overview of the System Components and Operation.

FIG. 1 illustrates the general architecture of a Local Assistant: a system, implemented by E-traffic Inc., that operates in accordance with the present invention. The Local Assistant system includes a Customer computer 100 running a Local Assistant client-side computer program 104, a Local Assistant Admin System 110 operating in the context of other Web sites (represented in FIG. 1 by Any Web Site 120), all of which are linked together by the Internet 130 (which is left implicit in the remaining figures of this document). The Customer computer 100 can be any type of computing device that allows a Customer to interactively browse Web sites via a Web Browser 107 and, preferably, to control other devices such as media players, location sensors, etc., represented in FIG. 1 by an interaction point 101 (such as a CD player) and an interaction manager 102 (such as Win Amp). (Note that the Web Browser 107 itself is an example of an interaction manager 102, the interaction point 101 being a mouse/keyboard/pointing device.) For example, the Customer computer 100 could be a personal computer (PC) connected to the Internet via a modem, or a hand-held or wearable computer connected to the Internet by wireless communication.

The Local Assistant client-side computer program 104, written in Java in the case of the E-traffic implementation, includes several functions: monitoring client interaction activity, determining applicable rules, interpreting rules, managing its local interaction data database (IDB), and managing its local ruleset database (RDB).

The Local Assistant program 104 interacts with the system resource manager 103 to determine current client activity such as open browser windows or running CD players. For each activity of interest, the Local Assistant program 104 constructs an information context from data obtained from the interaction manager 102. This information could be as simple as the name of a performing artist, or as complicated as the HTML text of a Web document. This information context extends the information context implicit in the local interaction data database (Local IDB) 106. The Local Assistant program 104 then queries the local ruleset database (Local RDB) 105 for applicable rules, and schedules and executes the rules using a simple, conventional scheduling algorithm to order multiple execution tasks. The rule interpreter functionality determines actions to take based on the rule and information context that it is given. Possible actions include: invoking other rules, retrieving HTML documents 122 from a Web server 121 and analyzing them to extract relevant data, requesting operations on the interaction data database 106, requesting operations on the ruleset database 105, posting updates to the Local Assistant Administrative site 110, and presenting information to and interacting with the Customer. The interaction data manager functionality provides access to the local interaction database 106 and manages creation, lookup, update and deletions of named data elements. The ruleset manager provides functionality to query the local ruleset database 105 for rules applicable in a given context; to suspend, resume or delete a ruleset; and to download new rulesets and ruleset updates from the Local Assistant Administrative site 110.

The Local Assistant system presents information to the Customer using the Web Browser 107 to display HTML formatted information. One kind of information presented is offers in the form of hyperlinks. Other forms of interaction provided by HTML are also possible.

The Local Assistant Admin System 110 is a site that provides functionality to download the Local Assistant client-side application 116, to update the client-side rulesets, to manage merchant database 113, admin ruleset database 114, and admin interaction database 115, and to upload interaction data summaries generated by rule execution on client machines.

In the Local Assistant preferred embodiment discussed herein, the rules and supporting meta-data are represented as XML text and stored, encoded, in files. The XML encoding takes place as follows: first, the XML file is compressed using the standard zip algorithm available in Java 1.1. Second, the bits are scrambled to make the resulting binary stream harder to decode. Secure Internet interaction between the Local Assistant Web server 111, a client-side browser 107 and a Local Assistant program 104 is accomplished by use of this encoding technique together with the HTTPS secure socket layer protocol and signed certificates. This assures the Customer that the Local Assistant software has the prescribed behavior and assures the Assisted Merchants that the rulesets designed for them are those that are executed by the Local Assistant.

The merchant database (Merchant DB) 113 contains information about each Assisted Merchant including: username/id, password, email, physical mail and telephone number, where the username/id is a unique identifier assigned by the Agent (e.g. E-traffic, Inc.) to the Assisted Merchant.

The administrative ruleset database (Admin RDB) 114 contains rulesets currently available for download. A ruleset in this database could be one designed for a particular Assisted Merchant, or a ruleset designed simply to benefit the Customer (for example, customization or local data management), making the use of the Local Assistant more appealing and widespread. The Local Assistant server-side ruleset manager provides functionality (to agent administrators) to add new rulesets, and to delete obsolete rulesets, and to define updates to maintain existing rulesets. It also provides functionality to download updates and new rulesets upon request, to keep download statistics and to control the number of allowed downloads for a given ruleset. For each ruleset, the following information is kept: name/id, date, merchant, file location (of the actual ruleset); maximum number, maximum number active, total number, number active; and start and end date.

The administrative interaction database (Admin IDB) 1115 contains anonymous interaction information uploaded from Customer computers as a result of execution of rules that specify such actions. The protocol used for uploading by the E-traffic preferred embodiment is the HTTP POST method, PATENT passing alists represented as strings. The database schema is restricted to accept only limited information, thus preserving Customer privacy.

The Local Assistant installation download 116 is a file with executable code that will install the Local Assistant client-side program once the Customer has confirmed the download request and the Customer computer 100 has authenticated the connection.

The Local Assistant client-side application can be downloaded from the Local Assistant Admin System Web Site either by directly accessing the Local Assistant Web Site, or by using special links embedded in a Web document served by an Assisted Merchant, or other Web site.

The Any Web Site component 120 represents information available as HTML documents 122 and delivered upon request by the Web server 121. Some documents may contain links for downloading the Local Assistant program. If a download link is contained in a document on an Assisted Merchant's site, then downloading the system will result in also downloading rulesets associated with that Assisted Merchant. Documents on other Web sites may be targets for analysis by Local Assistant rulesets. For example, pages from booksellers sites can be analyzed for title, author, price, ISBN and other information.

The Local Assistant system is virtually risk free because it doesn't require ANY modifications to the Assisted Merchant Web site or e-commerce software. All of the promotions are executed in compact downloads in the Customer's browser. No data need be transmitted directly back to the Assisted Merchant site.

Using the Local Assistant program, the Assisted Merchant can present special offers, tailored precisely to the interests of a target Customer, at exactly the moment the Customer is looking for products like the Assisted Merchant's products. In one scenario, an Assisted Merchant can present a price quote for a book every time the Customer asks for a quote from another book vendor. In another scenario, a merchant whose role is intermediary for a loyalty program can present an offer to a Customer to purchase via one or more loyalty program merchants when the Customer is shopping for products offered by these merchants. In yet another scenario, an Assisted Merchant can present a list of available CDs by an artist that the Customer is currently listening to.

The Local Assistant architecture is completely data-driven. The Local Assistant client-side system itself is built from a very small runtime core using the same type of XML rules, data and meta-data that is available to anyone else.

In other words, any application, such as the Web Assistant, the Loyalty Program Assistant, the Listener Assistant, or the Customizer, is built from the core engine by the addition of a "knowledge base" of data, meta-data and rules expressed in XML, along with user interface components.

When operating in conjunction with the browser, the user interface components are themselves expressed as data, in HTML. Thus, the core engine provides a highly extensible platform for delivering new applications and functionality, with minimal maintenance headaches and no required installation.

Because the system is built using itself, the core engine is automatically exercised in a very extensive manner during standard system operations, guaranteeing a high degree of code path coverage. Since no new code need be written, the emphasis can be on the testing and understanding of the knowledge embodied in the underlying XML rules.

3. Download of Local Assistant by Customer.

Figure 2A:
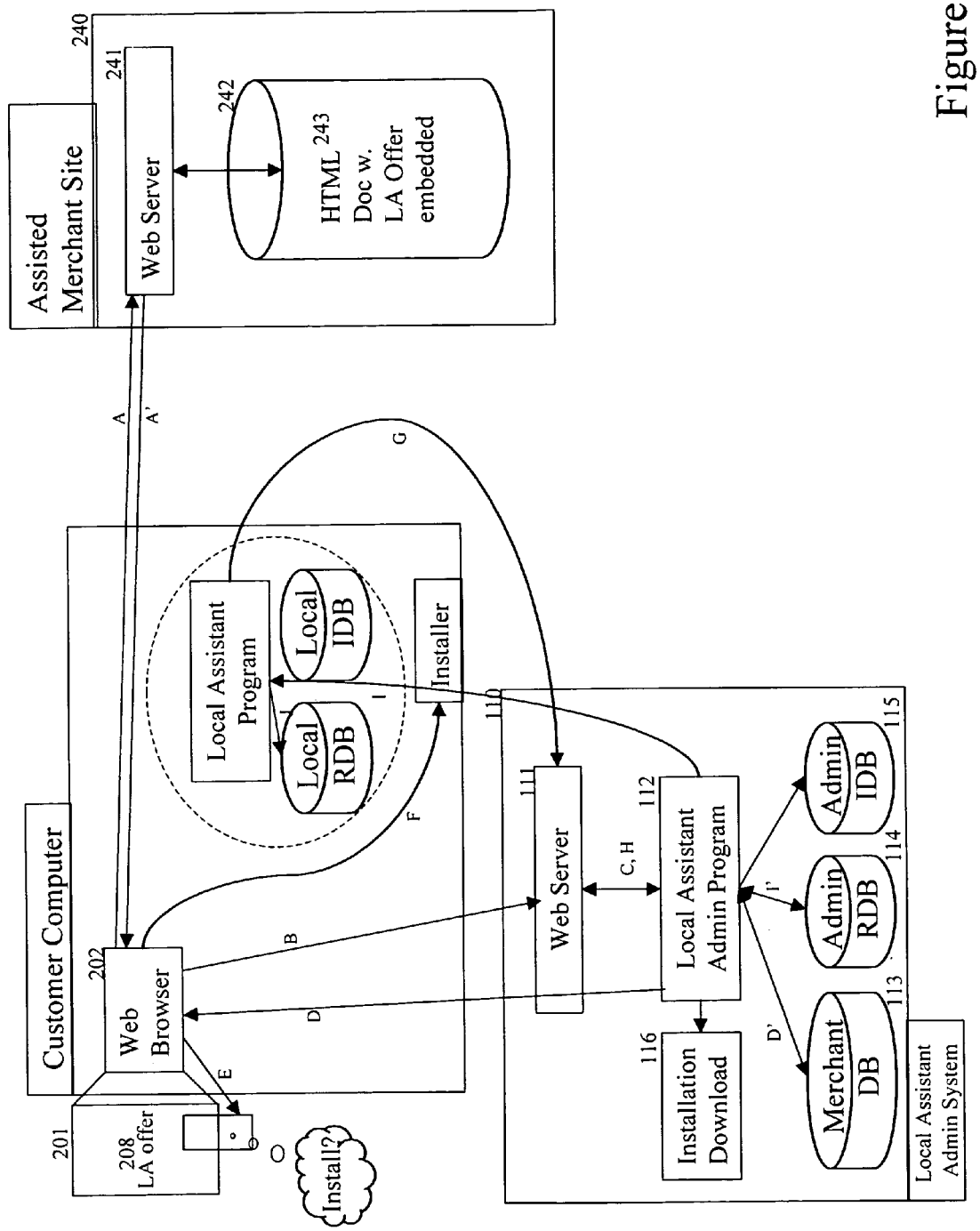
FIGS. 2a–2b are, respectively, an architectural drawing and flow diagram illustrating the Customer enabling function of the system that allows a Customer to download the systems client-side core.
Figure 2B:
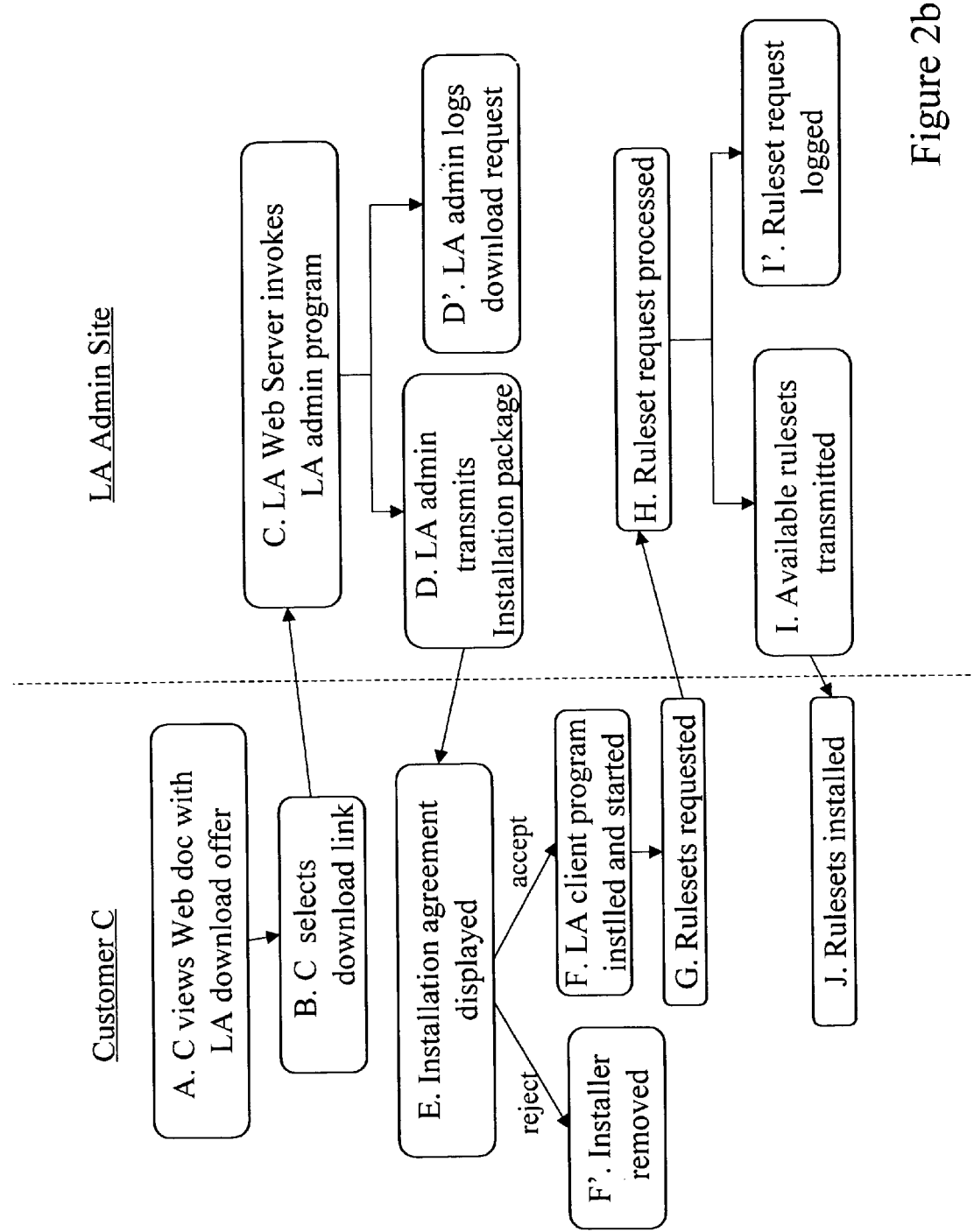

A preferred method for downloading the Local Assistant client-side software by a Customer is now described. FIGS. 2a–2b depict the flow of information and sequence of events in an example scenario of this process.

Referring to FIG. 2a, a Customer accesses an Assisted Merchant's Web site 240 via the Customer computer 100. The Customer computer 100 contains a conventional Web browser 202 (viewed as an interaction manager) which communicates with the Assisted Merchant's Web server 241 using the HTTP protocol. As depicted by events A and A' in FIG. 2a, the Assisted Merchant's Web server 241 accesses a local store of HTML documents 242 that can be requested, retrieved and viewed by the Customer using the Web browser 202. The retrieved document (depicted in FIG. 2a as 243 on the server side and 201 on the client side) contains a download link 208 to the Local Assistant Admin System site 110. For example, the URL to embedd in a download offer from the E-traffic Agent might look like:

https://secure.etraffic.com/get_download.asp

Preferably, the document also contains descriptive information about the Assisted Merchant and the Local Assistant system that will encourage the Customer to proceed.

Again referring to FIGS. 2a–2b, upon clicking or otherwise selecting the download link 208 of the Assisted Merchant's document 201 (event B), the Web browser 202 communicates with the Local Assistant Admin Web server 111 which further communicates with the Local Assistant Admin program 112 (event C) to retrieve the system installation package 116. The installation package 116 is transmitted, using a secure protocol such as HTTPS, to the Customer computer 100 to execute (event D) and, concurrently, the download request is logged (event D'). The Customer is shown an installation agreement window (event E) which provides authentication information and allows the Customer to accept or decline installation of the Local Assistant client-side package. If the Customer rejects the installation agreement, then the installation package removes itself from the Customer's computer 100 (event F'). If the Customer accepts the installation agreement, then installation continues: the Local Assistant client-side code 104 is copied into a designated folder, the local ruleset database 105 and interaction database 106 are initialized, and the Local Assistant program 104 is started (event F). The client-side program analyzes the HTML document 201 containing the download link 208 to determine which application rulesets to download. The Local Assistant client program 104 transmits a request for rulesets to the Local Assistant server 111 (event G) which in turn invokes the Local Assistant admin program 112 (event H). Those requested rulesets that are available for download are transmitted to the Local Assistant client-side (event I) and stored in the local ruleset database 105 (event J). Concurrently, the Local Assistant admin program 112 logs the request in the admin ruleset database 114 (event I').

In FIG. 2a, the dashed line enclosing the Local Assistant components 104, 105 and 106 is used to indicate that these components are not initially present, but are present after the download completes.

Although the above describes the case in which the Local Assistant program download link is contained in an Assisted Merchant's HTML document, this is not necessarily the case. Links for download of the core system and non-merchant specific rulesets could be placed in any HTML documents, for example as advertisements placed by the Local Assistant agent. The intent is that the Local Assistant client-side core system be freely and widely available.

4. A Web Assistant Application

Figure 3A:
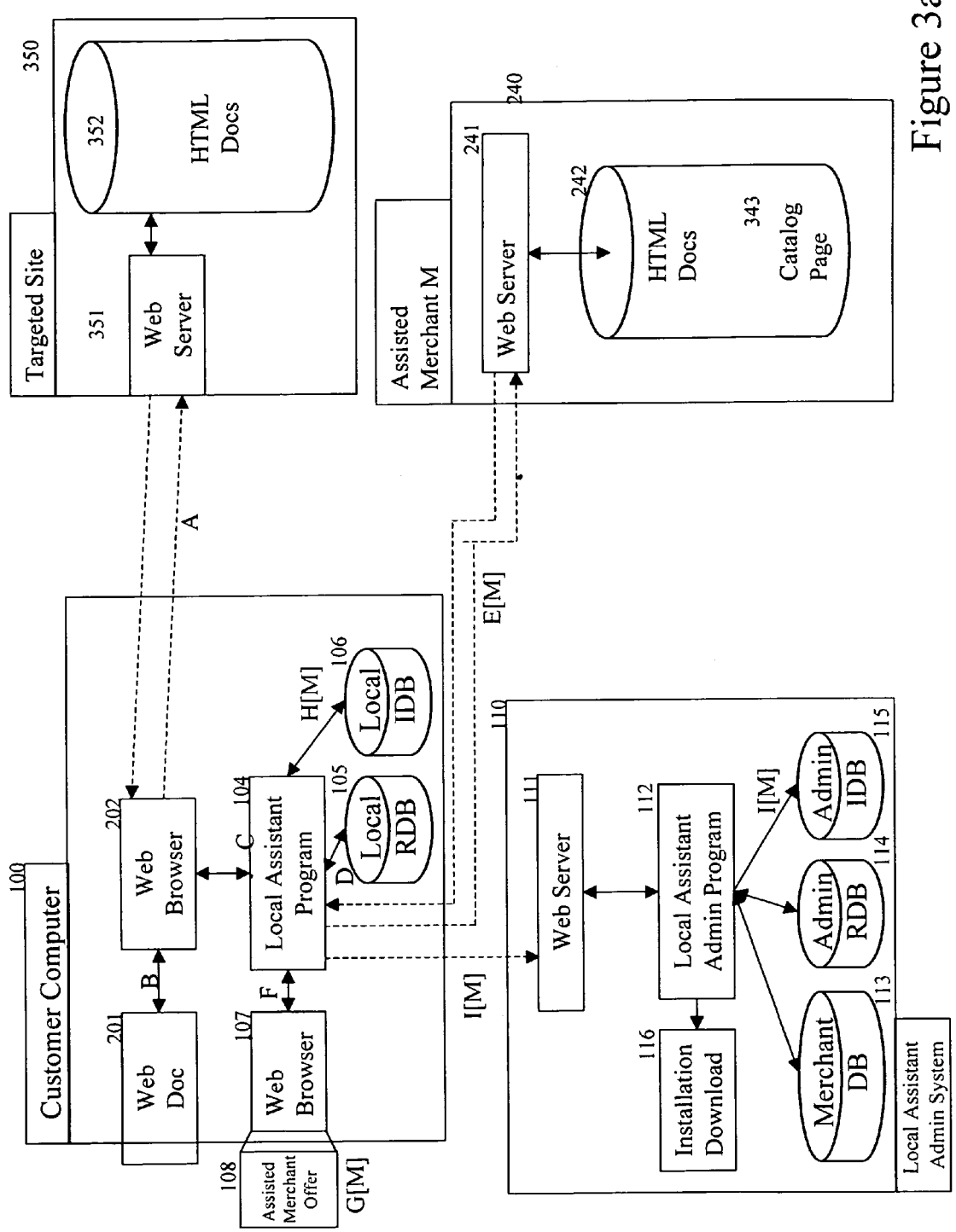
FIGS. 3a–3b are, respectively, an architectural drawing and flow diagram illustrating a Web Assistant application producing offers based on analysis of targeted Web pages being viewed by the Customer and on further information gathered from the Web.
Figure 3B:
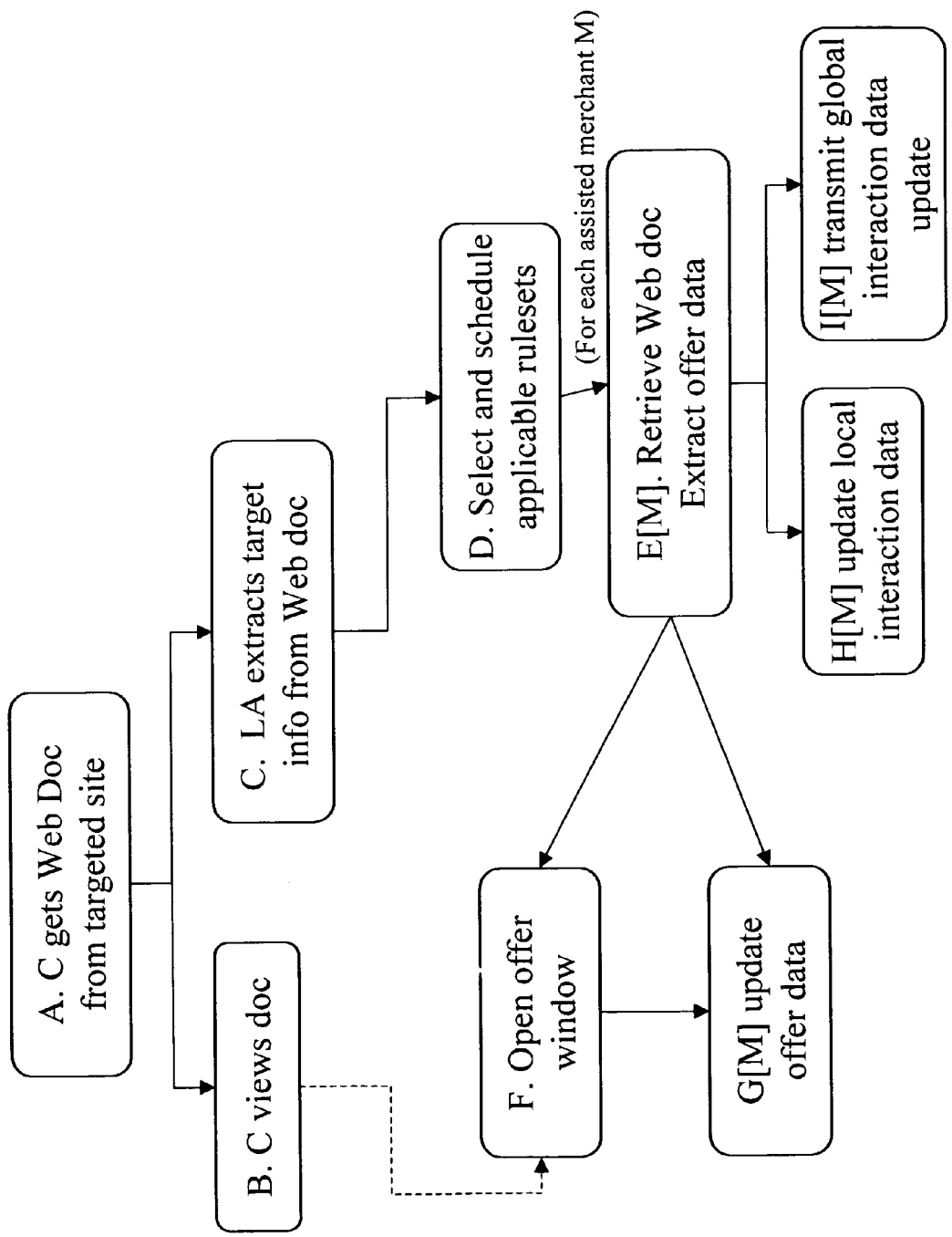

FIGS. 3a–3b illustrate the flow of information and sequence of events when a Local Assistant Web assistant application operates on a Customer computer 100. The Customer (via the Web browser 202 as interaction manager) requests and is presented with a Web document 201 retrieved from a targeted site 350 (event A). The Customer views the retrieved document 201 (event B). Concurrently, the Local Assistant client program becomes aware that a new page is being viewed by interacting with the system resource manager (not depicted in FIG. 3a) and the Web browser 202 (event C). Rules to analyze the web document being viewed 201 are obtained from the rule database 105 and used to analyze the document (event D). For example, if the document is an amazon.com catalog page for a book, then the following rule

```
<PE>
<CatId>StepInfo</CatId>
<tag>body</tag>
<steptype>traverse</steptype>
<merchant>amazon.com</merchant>
<feature>amazon.xml</feature>
<target>http://www.amazon.com/exec/obidos</target>
<dataelement>isbn</dataelement>
<pattern>"ISBN:" word:</pattern>
</PE>
``` discovers the ISBN of the book being considered. It extends the current information context by associating the word following "ISBN:" in an HTML document to the name "isbn". Below is a fragment of the HTML source for a book catalog page from amazon.com.

```
<html>
<head>
<title>Amazon.com: buying info: On Writing: A Memoir
    of the Craft</title>
</head>
. . .
<font face="Arial,Helvetica" size=-2>Scribner; ISBN:
    0684853523
</font><br>
. . .
</body>
</html>
```

The above rule executed in the context of this page would add isbn=0684853523 to the information context. A similar rule is used to discover the price.

An Assisted Merchant using the Web assistant will define bid rules that determine for each target merchant of interest what form of offer should be made, if any, when the Customer is looking at a particular catalog page. For example, the Assisted Merchant might have a rule that meets or underbids the price of an amazon.com item, but offers its standard price with free shipping when bidding against barnesandnoble.com. In either case, the ruleset for the Assisted Merchant will contain a rule to retrieve and analyze the Assisted Merchant's catalog page containing the item of interest and then to use this information in conjunction with the bid rules to produce an offer.

For example the following rule will obtain price information for a book from fatbrain.com:

```
<PE>
<CatId>StepInfo</CatId>
<Key>fatbrainsearchprice</Key>
<feature>fatmaven.xml</feature>
<steptype>search</steptype>
<sets>price reference title</sets>
<webquery><Add>
"http://www   1.fatbrain.com/asp/bookinfo/
    bookinfo.asp?theisbn="!ISBN
</Add></webquery>
</PE>
```

Returning to FIGS. 3a–3b, the Local Assistant client program executes the rulesets for each Web assistant Assisted Merchant M (events E[M]). A product catalog document 343 is requested from the Assisted Merchant's Web site 240 and analyzed using targeted rules to extract information needed to make an offer, for example the book price. If any offer becomes available, then an offer window is made visible (event F) and further offers are presented as they become available (event G[M]). In addition, the Web assistant ruleset for a given Assisted Merchant M may store offer information in the local interaction database 106 (event H[M]) and may also request updates of the Local Assistant admin interaction database 115 (event I[M]).

Figure 3C:
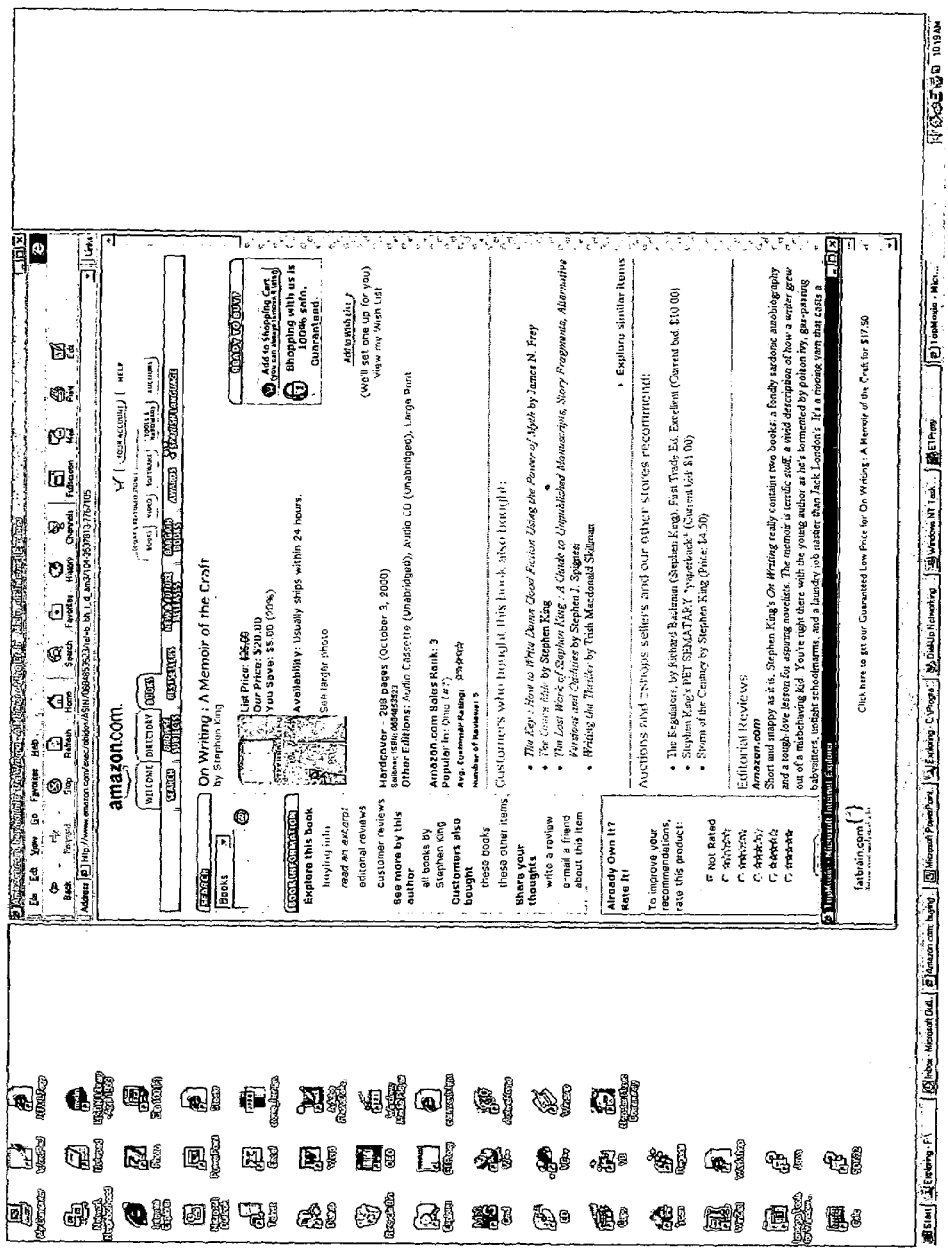
FIG. 3c is a screen shot further illustrating the Web Assistant application.

FIG. 3c is a screen shot showing an offer from FatBrain in response to the customer visiting a page from the Amazon book catalog.

5. A Loyalty Program Assistant Application

FIGS. 3a–3b also can be used to illustrate the flow of information and sequence of events when a Local Assistant Loyalty Program Assistant application operates on a Customer computer 100. Events A–D are the same as for the Web Assistant Application discussed above: the Customer views a Web document 201 from a targeted site 350 and the Local Assistant client program uses target document rules to extract relevant information, for example, the ISBN and price of a book.

An Assisted Merchant using the Loyalty Program Assistant will define rules for determining the participating merchants and for each merchant, relevant attributes and a link to a loyalty program entry to their site. For example, schoolcash.com is an intermediary for a school rebate program whereby participating merchants donate a percentage of each purchase through this program to the school of the purchaser's choice. The relevant attribute in this case is the percent rebate—each merchant may be different. In addition to the participating merchant data, there are rules for getting a price quote from each targeted participating merchant that sells the product in question. Finally there are rules for combining the premium and price data to produce an offer. For each Loyalty Assisted Merchant M, the Local Assistant client program executes the associated rulesets (event E[M]).

Figure 3D:
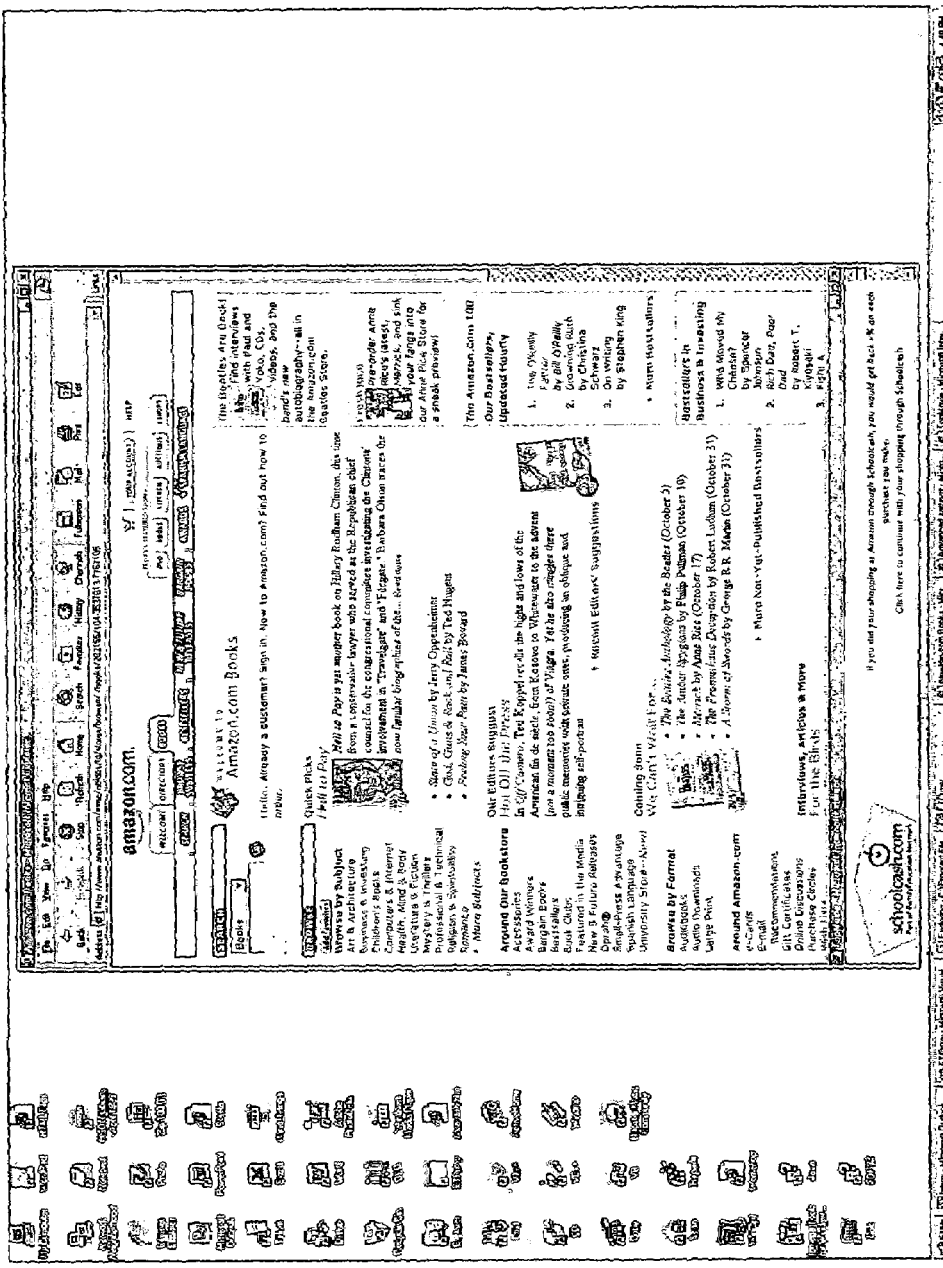
FIG. 3d is a screen shot further illustrating the Loyalty Program Assistant application.

As in the case of the Web Assistant scenario, an offer window is made visible, offers are presented and local and admin interaction databases may be updated (events F, G–I[M]). FIG. 3d is a screen shot showing an offer from SchoolCash to a Customer visiting a page from the Amazon book catalog. The offer reminds the Customer of the Amazon rebate rate and provides a convenient link for the Customer to make a purchase through the loyalty program.

A Customer's ruleset database may contain both Web and Loyalty assistant rulesets, and, in this case, the applicable rules from both sorts of ruleset will be executed.

In a variation of the Loyalty Program Assistant, there are rules to determine the participating merchant data dynamically, before gathering the data to make offers. These rules request Web documents from the Assisted Merchant's Web site and analyze them to obtain the needed information.

6. Listener Assistant Application

Figure 4A:
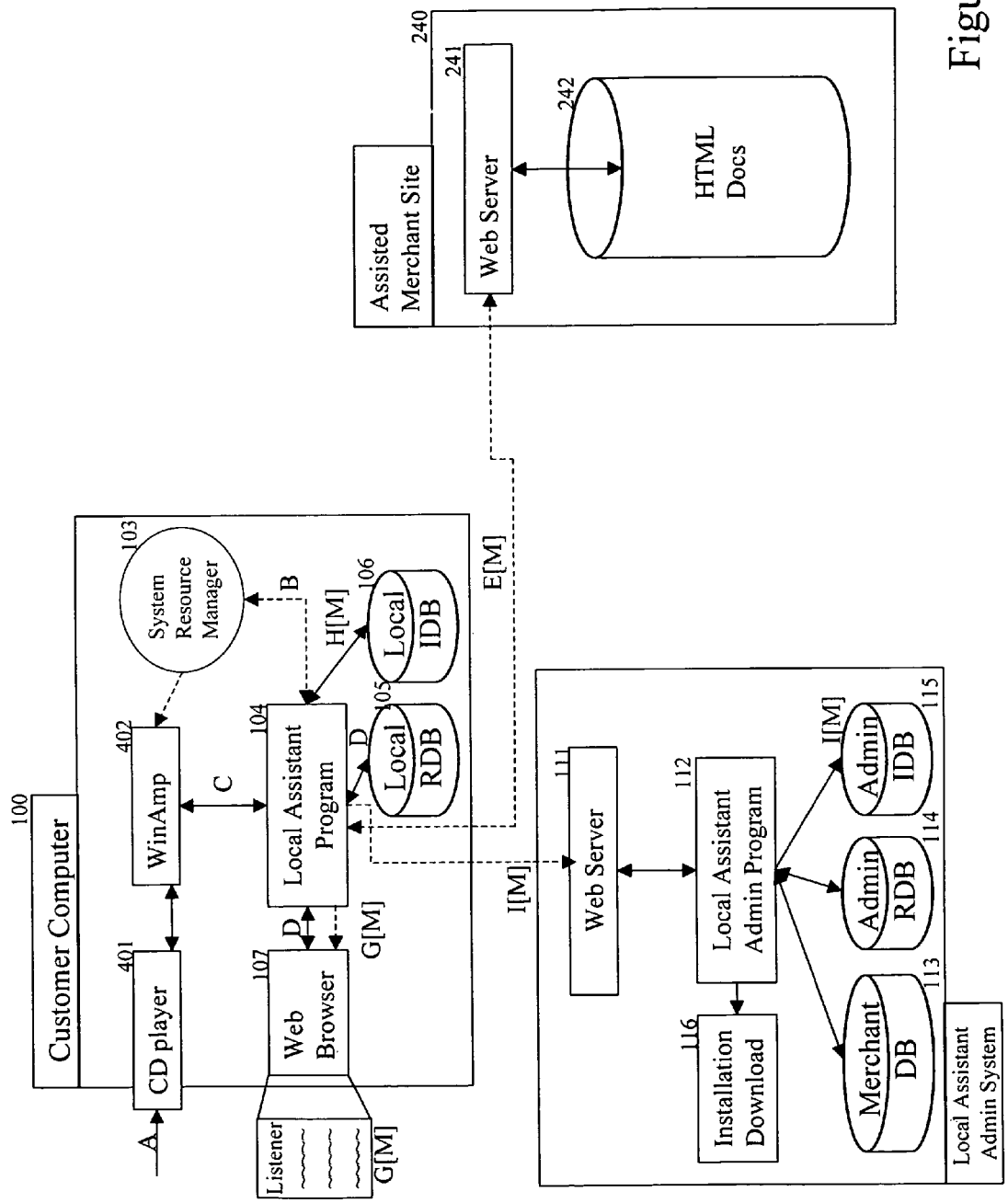
FIGS. 4a–4b are, respectively, an architectural drawing and flow diagram illustrating a Listener Assistant application producing offers based on information about a currently playing CD and further information gathered from the Web.
Figure 4B:
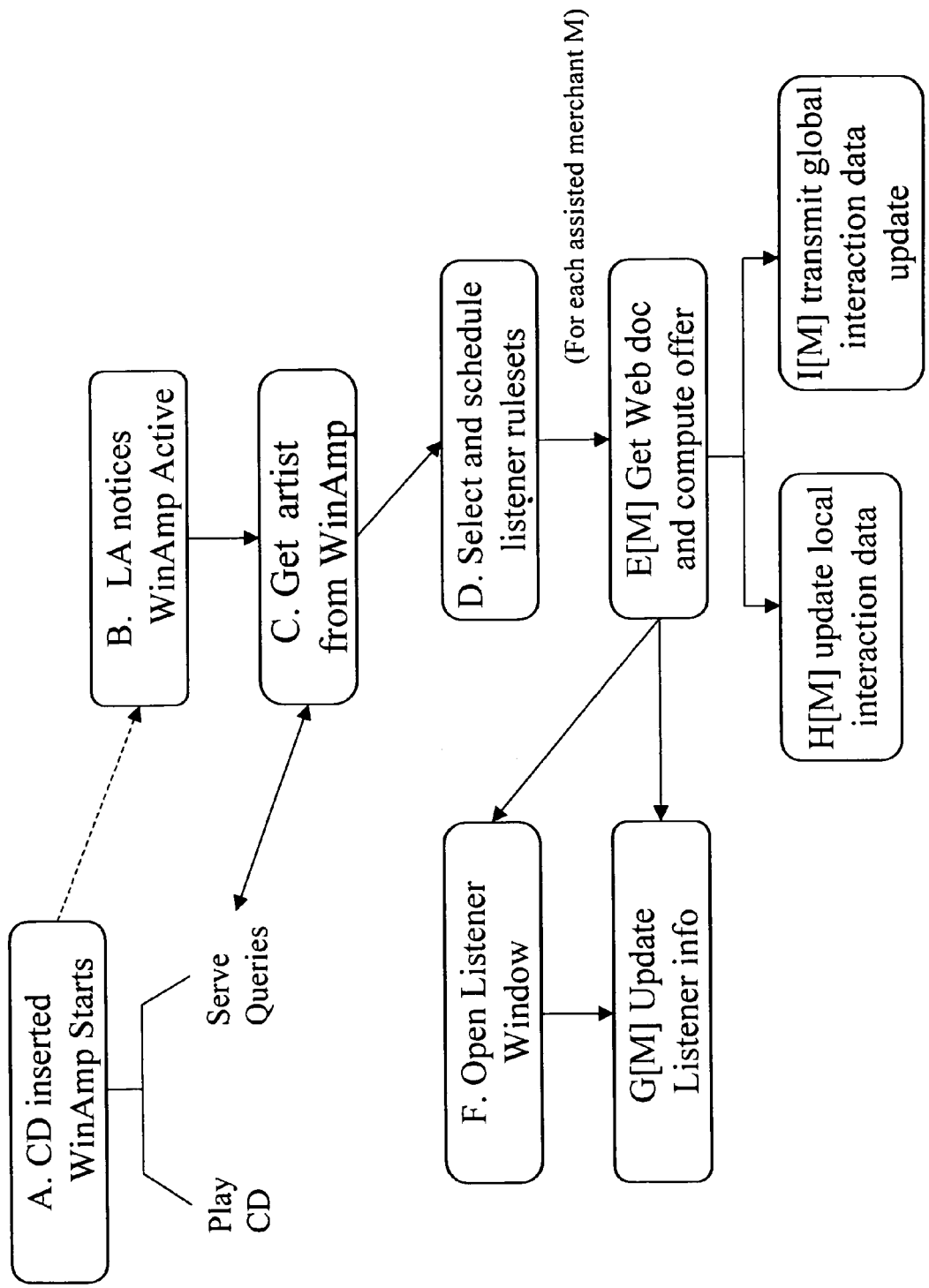

FIGS. 4a–4b illustrate the flow of information and sequence of events when a Local Assistant Listener Assistant application operates on a Customer computer 100. In this scenario, the Customer inserts a CD into the CD player 401 and a media player application 402 is started, for example WinAmp (event A). The Local Assistant client program 104 becomes aware that a CD is playing by interacting with the system resource manager 103 (event B) and requests artist information from the WinAmp player (event C).

A Listener Assisted Merchant will have a ruleset with rules to generate offers related to the artist playing. For example, amazon.com or cdnow.com might have rules to collect a list of all the CDs by that artist in their catalog and present this along with links and possibly price/availability information. An online ticket agency might have rules to gather a list of all the upcoming concerts by this artist (and possibly artists considered to be related in some way) for which the agency sells tickets. Other information, such as reviews and articles relating to the artist, could also be collected.

Figure 4C:
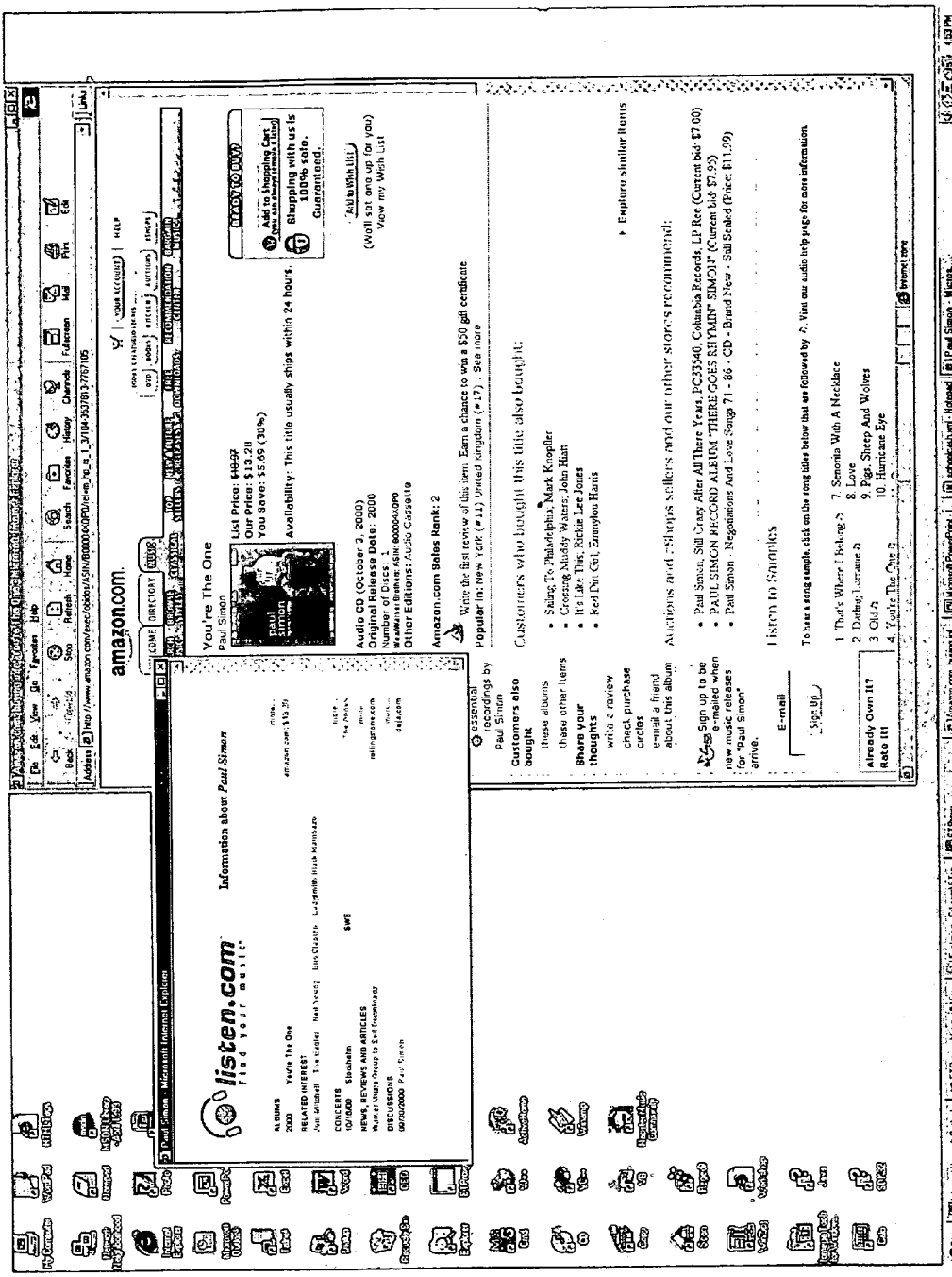
FIG. 4c is a screen shot further illustrating the Listener Assistant application.

Returning to FIGS. 4a–4b, the Local Assistant client program selects applicable rules from the ruleset database 105 for each Listener Assisted Merchant M and schedules them for execution (event D). Again, as soon as any offer is available, a Listener display is made visible (event E). The selected rules for Assisted Merchant M are executed (event F[M]). This may result in retrieval and analysis of Web documents and consequent production of offers. As in the case of the Web and Loyalty assistants, any offers produced are displayed, and updates to the local and administrative interaction databases are made (events G–I[M]), FIG. 4c shows a screen shot of the information produced when a customer was listening to a Paul Simon recording. The information includes a an album offer (from Amazon) and links to a review, concert information, and a news group article.

7. News Notification Application

Figure 5A:
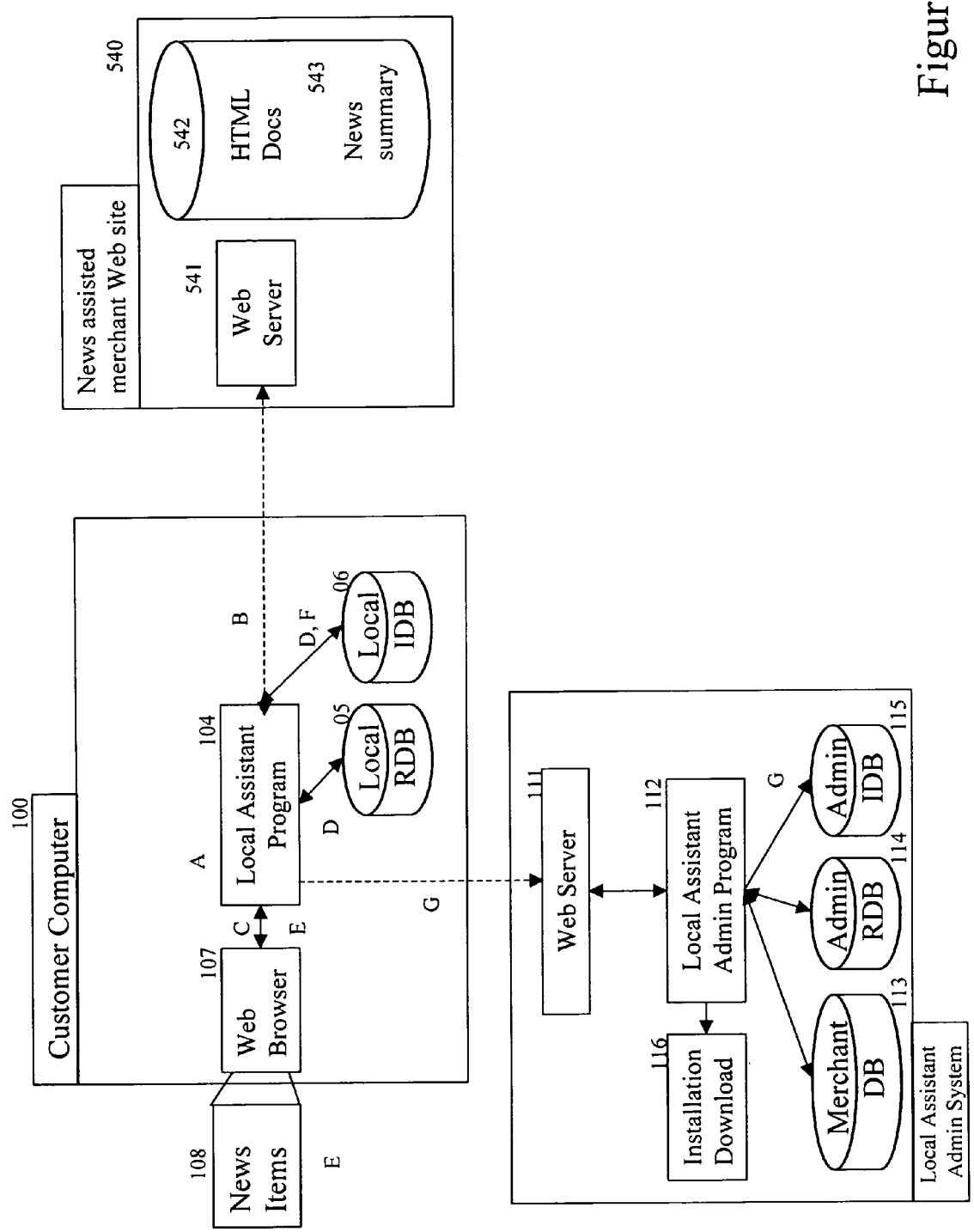
FIGS. 5a–5b are, respectively, an architectural drawing and flow diagram illustrating a News Assistant application in which periodic information gathering produces offers and information from one or more targeted sites based on Customer preferences and accumulated interaction data.
Figure 5B:
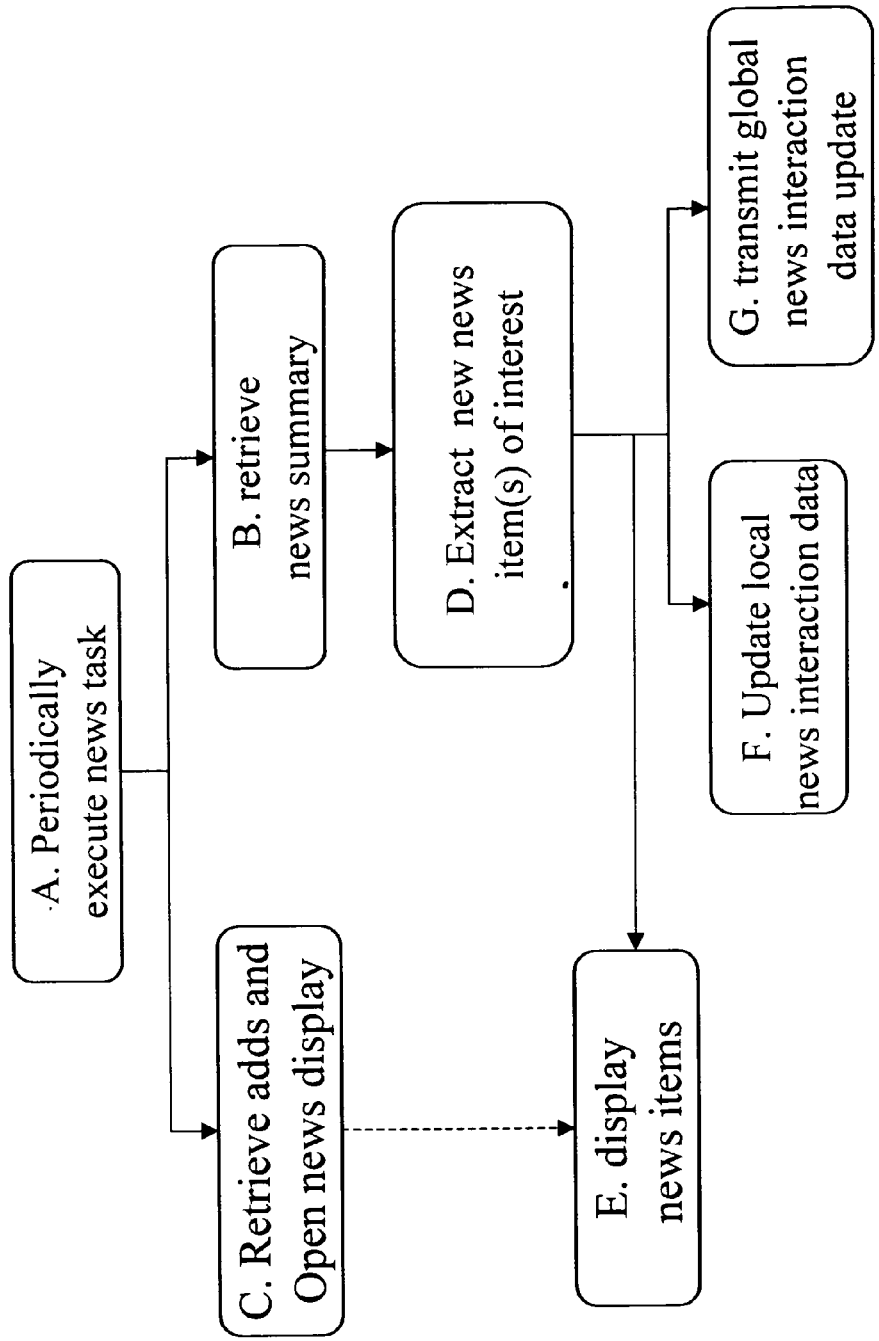

FIGS. 5a–5b illustrate the flow of information and sequence of events when a Local Assistant News Assistant application operates on a Customer computer 100. In such an application, a News assistant ruleset contains a task to be executed periodically. This task retrieves a news summary document from the News Assisted Merchant's site. As an example, the following is a rule that retrieves current news from cnet.com:

```
<PE>
<CatId>StepInfo</CatId>
<Key>getcnet</Key>
<feature>cnet.xml</feature>
<steptype>task</steptype>
<repeattime>15</repeattime>
<feature>cnet.xml</feature>
<Do>
   <set>cnetfound "false"</set>
   <getpage>
      "http://news.cnet.com/"
      <mkalist>whendone<mklist>donecnet</mklist></mkalist>
   </getpage>
</Do>
</PE>
```

This rule specifies that it should be executed every 15 minutes. Execution of the rule sets a flag used to check whether any new news was found. The cnet.com ruleset also contains rules (not shown) to analyze the summary page and collect a list of current news items, each item containing a description and a link to the actual news document. The local interaction data contains a history of news items already seen and also a list of topics of interest to the Customer (maintained using the customization application described below). In the depicted scenario, the Local Assistant client program 104 executes the cnet news gathering task (event A). A news summary page 543 is retrieved from the News Assisted Merchant's Web site 540 (event B). A news window is made visible (event C); this window may initially contain advertisements provided by the News Assisted Merchant. Using the news summary from event B, and the history and news preferences obtained from the local interaction database, a list of new items on topics of interest is generated (event D) and displayed in the news window. The local interaction database is then updated to reflect the most recent news retrieved (event F).

Figure 5C:
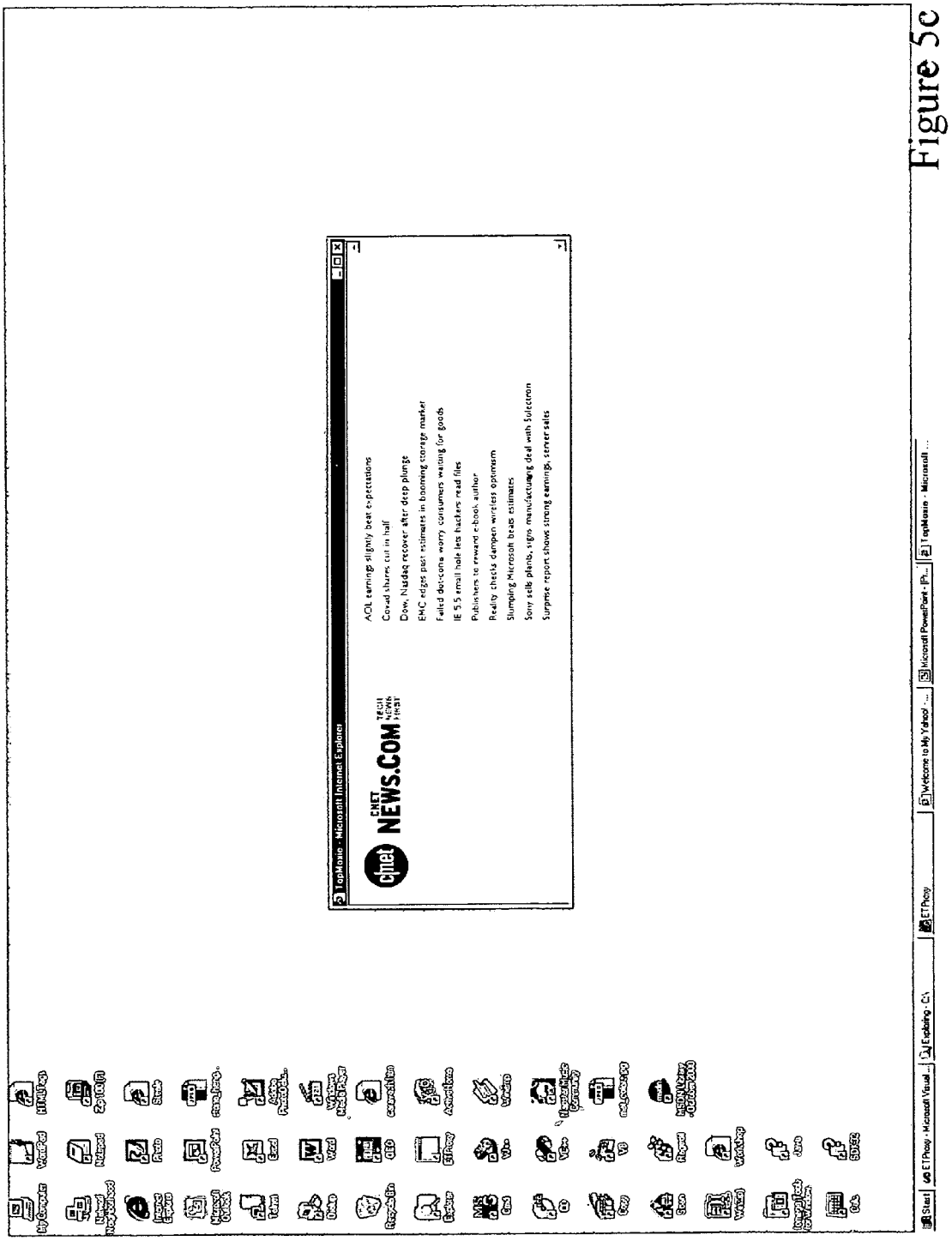
FIG. 5c is a screen shot further illustrating the information/offers application with target site CNET news.

FIG. 5c shows a screen shot of a CNET news offer with several technical news items.

8. Local Assistant Client-Side Customization Application.

Figure 6A:
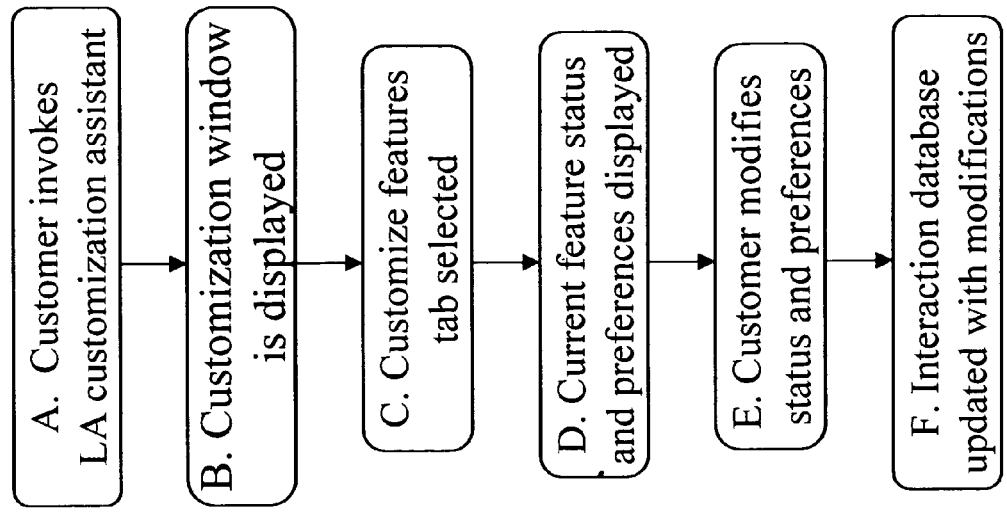
FIG. 6a contains an architectural drawing and flow diagram illustrating an application that allows the Customer to customize the client-side behavior of the system by interaction with the ruleset manager.
Figure 6A:
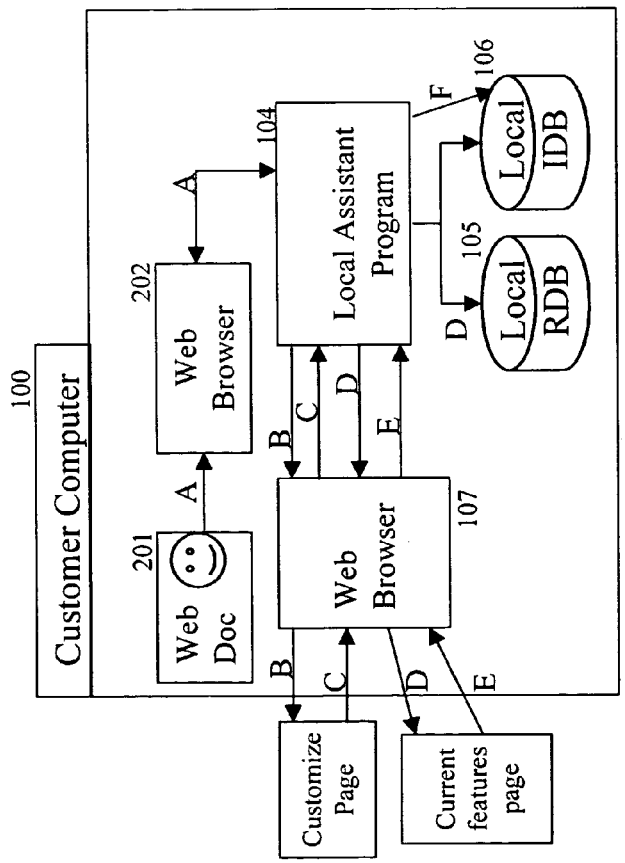
Figure 6B:
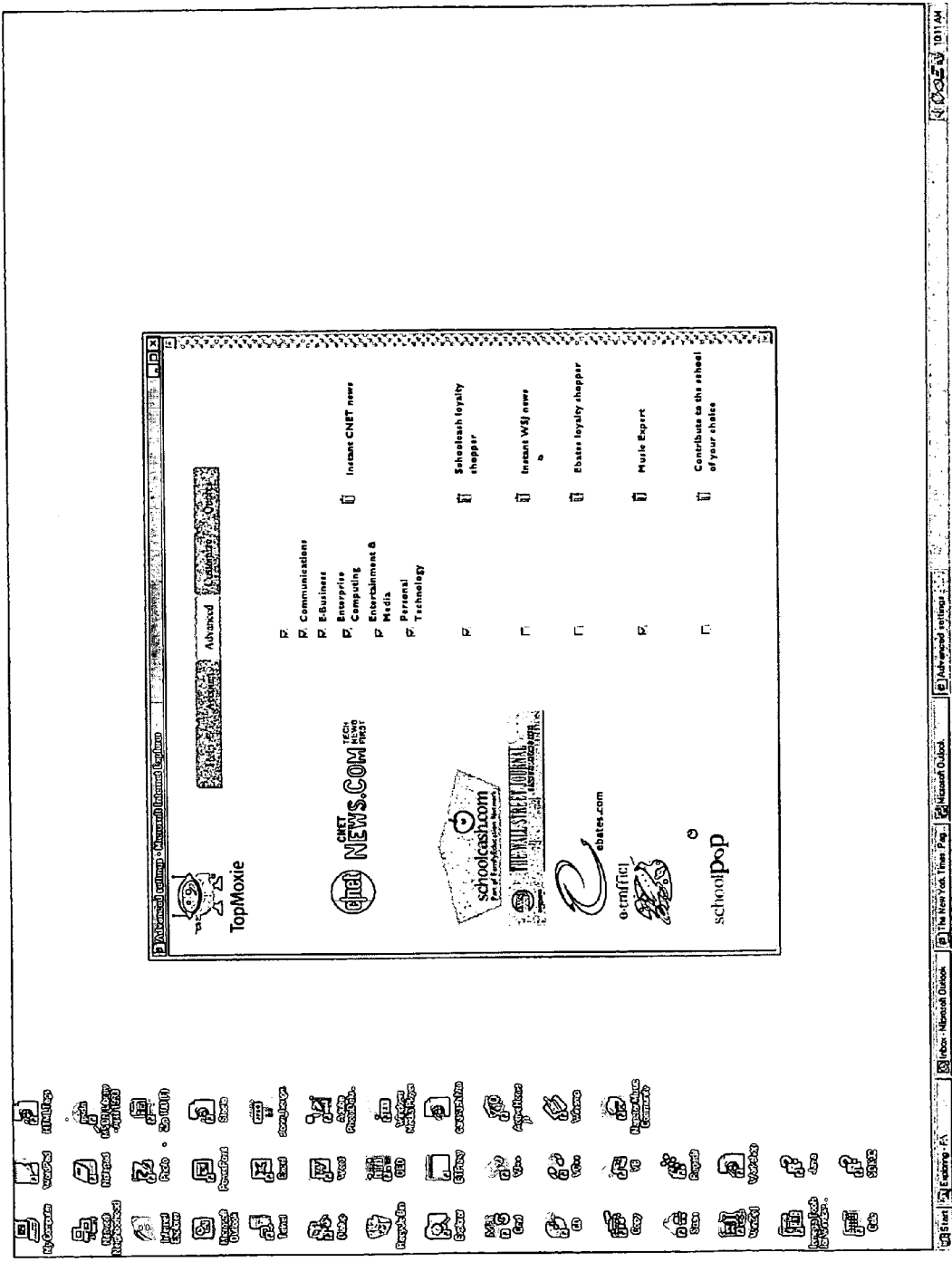
FIG. 6b is a screen shot further illustrating the customizing application.

FIG. 6a illustrates the flow of information and sequence of events for one scenario in which the Customer interacts with the Local Assistant Client-side Customization Assistant. The ruleset for this assistant is part of the core system download. In this scenario, the Customer accesses the Customization application, possibly by a browser context menu item or an icon on the toolbar (event A). A customization window is displayed with tabs for several options (event B). The Customer choosed the advanced tab (event C). A list of rulesets (called "features" in the E-traffic preferred embodiment of the Local Assistant) and options for each feature, with the Customer's current preferences, is displayed using rules that query the ruleset and interaction database to gather this information (event D). The Customer checks the personal technology and the entertainment topic boxes. The Customer also checks the SchoolCash box to enable this feature and unchecks the SchoolPop box to suspend application of the rules of this assistant ruleset (event E). The interaction data is updated to reflect the modified status a preferences (event F). FIG. 6b is a screen shot showing the current features option of the Customizer Assistant.

Figure 7A:
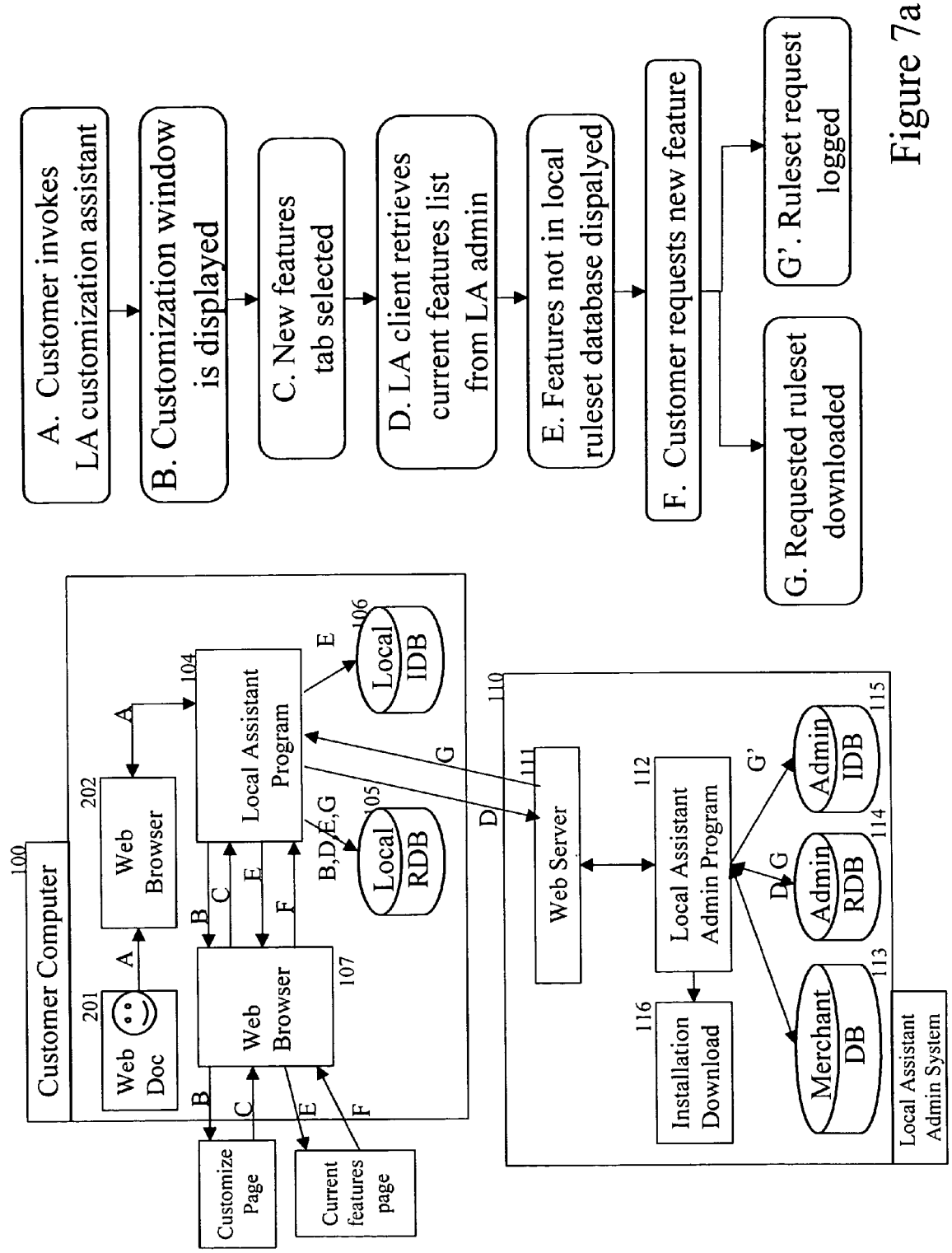
FIG. 7a contains an architectural drawing and flow diagram illustrating an application that allows the Customer to view newly available rulesets and to download rulesets of interest.
Figure 7B:
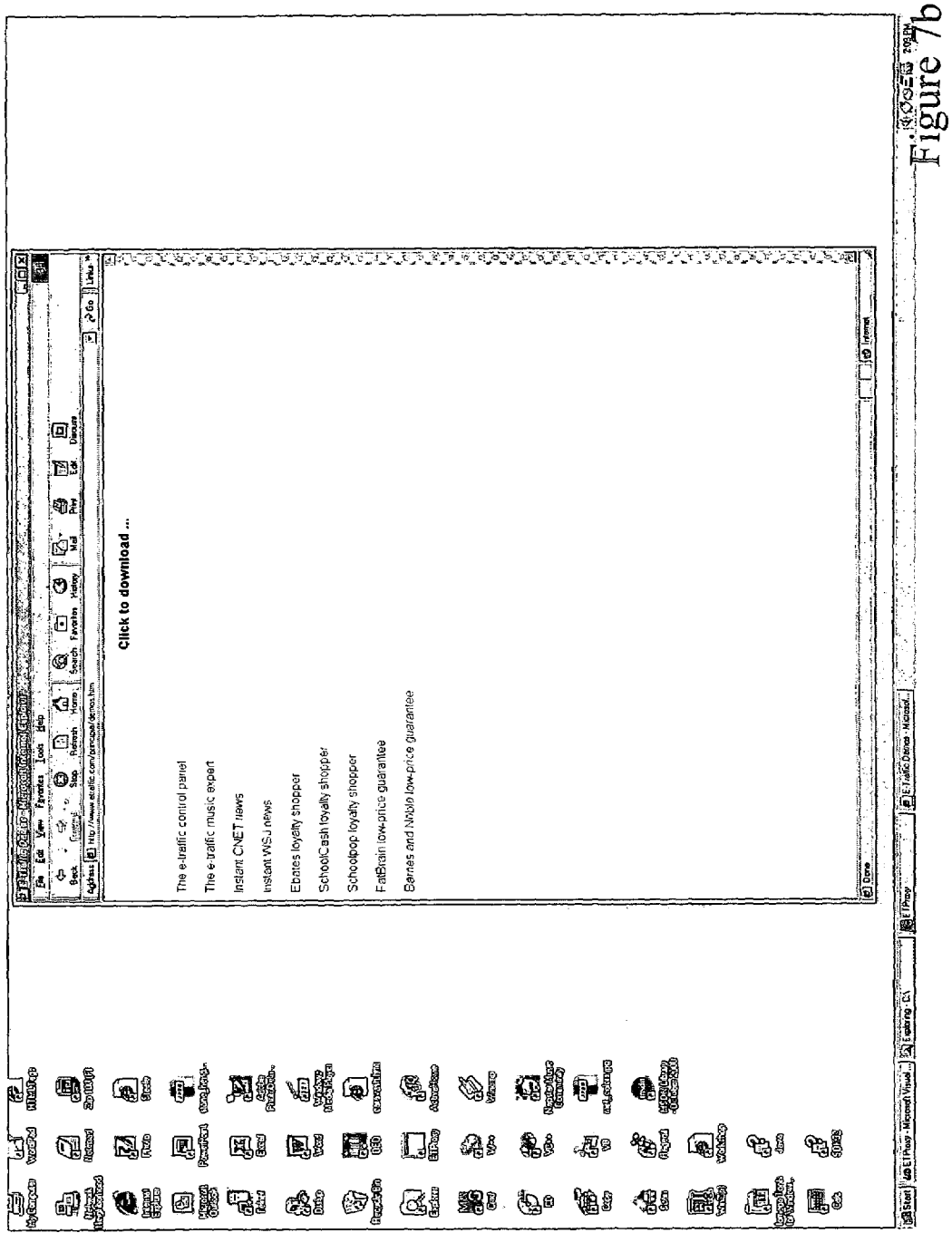
FIG. 7b is a screen shot further illustrating this application.

In another scenario, depicted by FIG. 7a, events A and B (invoking the customization assistant) are the same as in the first scenario described above. In this scenario, the Customer selects the tab to view any new features that might be available (event C). The Local Assistant client-side program 104 retrieves a list of the currently available rulesets from the Legal Assistant admin site 110 (event D). A rule to remove features from this list that currently exist in the local ruleset database 105 is executed, and the resulting list of features is displayed (event E). FIG. 7b is a screen shot showing a list of downloadable features. The Customer requests the new SchoolCash loyalty shopper (event F). The feature is downloaded from the Local Assistant admin site 110 (event G) and the download request is logged by the Local Assistant admin program (event G'). The feature download event consists of several actions: the Local Assistant client-side program transmits a request for the ruleset to the Local Assistant server; the Local Assistant server confirms that another download of this ruleset is allowed, and transmits the encoded file containing the ruleset via HTTPS; and the Local Assistant client-side program adds the newly downloaded ruleset to the local ruleset database.

In a little more detail, direct interaction between the Local Assistant client-side system and the Customer is accomplished using browser navigation and a special type of rule called a protocol. Navigation to an URL having a specific form results in interpretation of the file part of the URL as the name of a protocol rule possibly followed by data to be passed. For example, in the E-traffic implementation, navigation to the URL "Http://127.0.0.1:8765/_etraffic_showagenda_"
executes the protocol named showagenda. The trailing_indicates that no data is to be passed.

9. Conclusion

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. A method of providing a client-side local assistant program from an agent's computer system to a customer's computer system, the method comprising:

providing an agent Web site that presents a local assistant program download offer for viewing on the customer's computer system;

in response to selection by the customer's computer of a download link for the local assistant program download offer, invoking a server-side local assistant administrative system installed on the agent's computer system such that the local assistant administrative system transmits a local assistant installation agreement to the customer's computer system;

in response to receipt by the agent's computer system of an accepted local assistant installation agreement from the customer's computer system, installing a client-side local assistant program that does not require a web browser program and remains active by processing data on the customer's computer system until disabled or uninstalled regardless of the status of the web browser program or a connection between the customer's computer system and a server; and in response to receipt by the agent's computer system of a request from the customer's computer system for a predefined ruleset and information database associated with the local assistant program, installing the predefined ruleset and information database on the customer's computer system;

wherein the local assistant program modifies the ruleset by adding new rules or updating the ruleset while the local assistant program runs on the customer's computer system.

2. The method of claim 1, wherein the local assistant program includes functionality that allows the customer's computer system to observe, analyze, and/or store information regarding a computer-mediated customer interaction with the web browser program and other computer programs.

3. The method as in claim 2, and wherein the computer-mediated customer interaction comprises viewing a web page.

4. The method as in claim 2, and wherein the computer-mediated customer interaction comprises playing music through a computer program that is independent of the web browser program.

5. The method as in claim 1, and wherein the local assistant program includes functionality that allows the customer's computer system to define periodic scheduled tasks to be performed by the customer's computer system, whether or not the user is interacting with the customer's computer.

6. The method as in claim 5, and wherein the periodic tasks include gathering, analyzing and/or displaying information regarding predefined topics of interest;

wherein the information displayed is retrieved by the client-side local assistant program from multiple web sources.

7. The method as in claim 1, and wherein the local assistant program includes functionality that allows direct interaction between the local assistant program and the customer.

8. A computer-based system, installed on an agent's computer system, that provides presentation of selection information on a customer's computer system, the computer-based system comprising:

a client-side local assistant program that, upon request by a customer, is downloadable from the agent's computer system to the customer's computer system and operates independently of a web browser program and remains active on the customer's computer system until disabled or uninstalled regardless of the status of the web browser program or a connection between the customer's computer system and a server; and a server-side local assistant administrative system that, subsequent to download of the local assistant program to the customer's computer system, provides for access by the customer's computer system to at least one predefined ruleset and an associated information database relating to the selected information;

wherein the local assistant program modifies the ruleset by adding new rules or updating the ruleset while the local assistant program runs on the customer's computer system.

9. The computer-based system as in claim 8, and wherein the predefined ruleset and associate information database is downloadable from the agent's computer system to the customer's computer system.

10. The computer-based system as in claim 9, and wherein the server-side local assistant administrative system includes a merchant database that stores information relating to multiple assisted merchants.

11. The computer-based system as in claim 10, and wherein, subsequent to download of the predefined ruleset and associated information database to the customer's computer system, selected portions of the merchant database are downloadable to the customer's computer system in accordance with rules included in the predefined ruleset.

12. The computer-based system as in claim 8 and wherein the local assistant program includes functionality for specifying and/or interpreting rulesets for observing, analyzing and/or storing information regarding computer-mediated customer interactions.

13. The computer-based system as in claim 8, and wherein the local assistant program includes functionality for defining periodic tasks to be performed by the customer's computer system.

14. The computer-based system as in claim 8, and wherein the local assistant program includes functionality for direct interaction between the local assistant system and the local assistant administrative system.

15. The computer-based system as in claim 8, and wherein the local assistant program includes a rules interpreter that retrieves and analyzes web documents from multiple merchants or multiple information providers related to the selected information.

16. The computer-based system as in claim 8, and wherein the local assistant program includes a rules interpreter that creates and displays interactive windows related to the selected information.

17. The computer-based system as in claim 8, and wherein the local assistant program includes a rules interpreter system that reads and writes local interaction data related to the selected information on a local interaction database on the customer's computer system.

18. The computer-based system as in claim 8, and wherein the local assistant program includes a rules interpreter system that transmits requests to the server-side local assistant administrative system for ruleset updates, receives the rule updates and stores the rule updates on a rules database on the customer's computer system.

19. The computer-based system as in claim 8, and wherein the local assistant program includes a rules interpreter system that transmits requests for updated interaction data relating to the selected information, receives the updated interaction data and stores the updated interaction data on a local interaction database on the customer's computer system.

20. The computer-based system as in claim 8, and wherein the local assistant program includes a rules interpreter system that allows the customer's computer system to interact directly with the local assistant system via browser navigation to a local reserved URL.

21. The computer-based system as in claim 20, and wherein the rules interpreter system includes functionality for parsing the local reserved URL to determine requested action and data to be determined by the customer's computer system.

* * * * *